United States Patent
Kamijo (10) Patent No.: US 7,101,531 B2
(45) Date of Patent: Sep. 5, 2006

(54) FUEL REFORMING SYSTEM AND CONTROL THEREFOR

(75) Inventor: Motohisa Kamijo, East Windsor, CT (US)

(73) Assignee: Nissan Motor Co., Ltd., Kanagawa (JP)

( * ) Notice: Subject to any disclaimer, the term of this patent is extended or adjusted under 35 U.S.C. 154(b) by 351 days.

(21) Appl. No.: 10/398,865

(22) PCT Filed: Oct. 25, 2002

(86) PCT No.: PCT/JP02/11079

§ 371 (c)(1),
(2), (4) Date: Apr. 10, 2003

(87) PCT Pub. No.: WO03/042097

PCT Pub. Date: May 22, 2003

(65) Prior Publication Data

US 2004/0043343 A1   Mar. 4, 2004

(30) Foreign Application Priority Data

Nov. 16, 2001   (JP) ............................. 2001-350997

(51) Int. Cl.
*C01B 3/24* (2006.01)
*C01B 3/26* (2006.01)
*H01M 8/04* (2006.01)
*B01D 53/56* (2006.01)

(52) U.S. Cl. .................. 423/650; 60/272; 60/274; 60/721; 422/105; 422/170; 422/171; 422/177; 422/190; 422/211; 423/239.1; 423/651; 423/652; 429/17; 429/19

(58) Field of Classification Search ............. 423/239.1, 423/239.2, 650, 651, 652, 653, 654; 429/17, 429/19, 170, 171, 177, 190, 105, 211; 422/170, 422/171, 177, 190, 105, 211; 60/721, 272, 60/274

See application file for complete search history.

(56) References Cited

U.S. PATENT DOCUMENTS

| 4,473,622 A | 9/1984 | Chludzinski et al. |
| 5,669,960 A * | 9/1997 | Couche .................. 95/96 |
| 5,750,082 A * | 5/1998 | Hepburn et al. ......... 423/213.5 |
| 5,888,470 A * | 3/1999 | Engler et al. ............ 423/650 |
| 2002/0110711 A1 | 8/2002 | Boneberg et al. |

FOREIGN PATENT DOCUMENTS

EP   1160193 A1   12/2001

(Continued)

Primary Examiner—Wayne A. Langel
(74) Attorney, Agent, or Firm—McDermott Will & Emery LLP (57) ABSTRACT

A fuel reforming system has a reformer (4) for reforming a fuel to produce a reformate gas; a shift converter (5) for reacting carbon monoxide (CO) contained in a reformate gas with water to produce hydrogen ($H_2$); a CO oxidizer (6) which removes CO discharged from the shift converter; and a startup combustor (11) for supplying combustion gas to the reformer (4), a shift converter (5) and CO oxidizer (6) to warm up them. An NOx trap (16) is disposed downstream of the startup combustor so as to adsorb nitrogen oxides (NOx) in combustion gas. A fuel reforming system further has a controller for controlling warm-up operations. When the warm-up operation for the reformer, the shift converter and the CO oxidizer is completed, the reformate reactions are commenced in the reformer (4). The NOx trapped by the NOx trap is decomposed by the reformate gas which contains CO gas and $H_2$ gas.

21 Claims, 7 Drawing Sheets

FOREIGN PATENT DOCUMENTS

| | | |
|---|---|---|
| JP | 9-63619 | 3/1997 |
| JP | 9-170744 | 7/1997 |
| JP | 2000-327305 | 11/2000 |
| WO | WO 99/31012 | 6/1999 |
| WO | WO 99/65097 | 12/1999 |

* cited by examiner

FUEL REFORMING SYSTEM AND CONTROL THEREFOR

FIELD OF THE INVENTION

This invention relates to a fuel reforming system. In particular, it relates to a fuel reforming system provided with an NOx trap for adsorbing nitrogen oxides (NOx).

BACKGROUND OF THE INVENTION

A startup combustor is sometimes used in order to warm up a reformer of a fuel reforming system. The startup combustor preferably combusts fuel at approximately a stoichiometric ratio due to the large amount of produced heat. However since the combustion temperature is high when combustion operations are performed at approximately a stoichiometric ratio, NOx is produced largely as a result of reactions between oxygen and nitrogen in the air. Consequently there is the possibility that NOx components will be present in exhaust emissions from the fuel reforming system. Furthermore when the fuel reforming system is applied to a fuel cell, entry of NOx into the fuel cell constitutes a cause of deterioration or contamination of the fuel cell. One method of preventing the production of NOx comprises control of the combustion temperature in the combustor to a temperature at which NOx is not produced.

A conventional technique disclosed in Tokkai Hei 9-063619 published by the Japanese Patent Office in 1997 sets the excess-air factor (air-fuel ratio/stoichiometric ratio) of the startup combustor to a value greater than one, for example to a value of three. Consequently the combustion temperature is suppressed because of the excess air amount introduced into the startup combustor.

SUMMARY OF THE INVENTION

However this method results in difficulties in maintaining flame characteristics and does not obtain stable startup combustion. Alternatively, although it is possible to suppress the temperature in the combustor by suppressing the amount of fuel used in oxidizing reactions, this has the disadvantage that the amount of heat required for starting the reformer is not produced.

It is therefore an object of this invention to advance startup operations in the fuel reforming system while removing NOx in the fuel reforming system.

In order to achieve above objects, this invention provides a fuel reforming system having a reformer for reforming fuel to produce a reformate gas containing hydrogen ($H_2$) gas and carbon monoxide (CO) gas; a shift converter for reacting carbon monoxide contained in the reformate gas with water ($H_2O$) to produce hydrogen; a CO oxidizer which removes CO gas from the reformate gas discharged from the shift converter and supplies the reformate gas to equipment using hydrogen gas; a startup combustor for supplying combustion gas to the reformer, the shift converter and the CO oxidizer so as to warm-up the fuel reforming system; and a gas passage allowing flow of combustion gas/reformate gas, the gas passage extending to the equipment using hydrogen gas from the startup combustion through the reformer, the shift converter and the CO oxidizer. The fuel reforming system comprises a first fuel supply device for supplying fuel to the startup combustor; a second fuel supply device for supplying fuel to the reformer; an air supply device for supplying air to the startup combustor; a spark plug for igniting fuel supplied to the startup combustor; an NOx trap disposed between the startup combustor and the equipment using hydrogen gas, the NOx trap adsorbing nitrogen oxides in the combustion gas; and a controller for controlling a warm-up operation of the fuel reforming system.

The controller has functions of commanding the air supply device to supply air to the startup combustor; commanding the first fuel supply device to supply fuel to the startup combustor; commanding the spark plug to ignite fuel in the startup combustor so as to initiate combustion in the startup combustor; and commanding the first fuel supply device to stop supplying fuel to the startup combustor after a first predetermined time has elapsed after initiating combustion, and then commanding the second fuel supply device to supply fuel to the reformer.

The details as well as other features and advantages of this invention are set forth in the remainder of the specification and are shown in the accompanying drawings.

DESCRIPTION OF THE PREFERRED EMBODIMENTS

Figure 1:
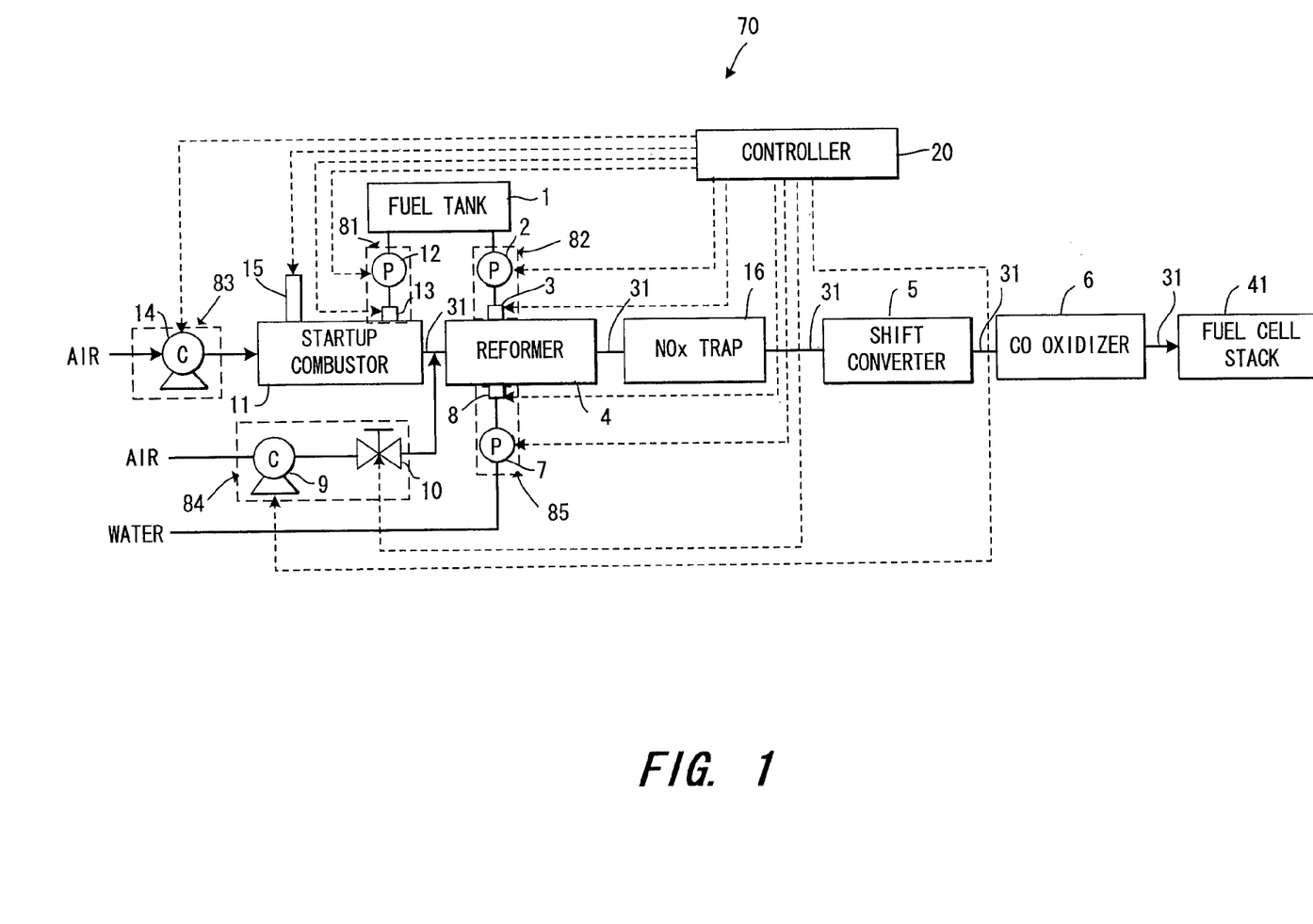
FIG. 1 is a schematic diagram of a fuel reforming system according to a first embodiment.

Referring to FIG. 1, a first embodiment will be described. The fuel reforming system 70 is provided with a fuel tank 1, a reformer 4, a shift converter 5, a CO oxidizer 6 and a startup combustor 11. In this description, the reformer 4, the shift converter 5 and the CO oxidizer 6 are simply referred to as "reactors" in some cases.

The fuel tank 1 stores a fuel such as a hydrocarbon (e.g. gasoline) or an alcohol (e.g. methanol). The reformer 4 reforms fuel using reactions between fuel and water in order to produce a reformate gas mainly comprising carbon monoxide (CO), hydrogen ($H_2$) gas and carbon dioxide ($CO_2$). The shift converter 5 reacts water ($H_2O$) with CO gas in the reformate gas discharged from the reformer 4 to produce hydrogen and carbon dioxide. The CO oxidizer 6 oxidizes and selectively removes CO from the hydrogen-rich reformate gas which is discharged from the shift converter 5 and supplies the resulting reformate gas to the fuel cell stack 41. This example of a fuel cell stack 41 requires a supply of reformate gas to generate power. However the CO oxidizer 6 may also supply gas to other equipment requiring reformate gas. The CO oxidizer 6 is a preferential oxidation reactor. The startup combustor 11 supplies combustion gas to the reformer 4, the shift converter 5 and the CO oxidizer 6 which are disposed downstream from the startup combustor 11.

The fuel reforming system is provided with a gas passage 31 allowing flow of combustion gas from the startup combustor 11 to the fuel cell stack 41 via the reformer 4, the shift converter 5, and the CO oxidizer 6 and flow of reformate gas from the reformer 4 to the fuel cell stack 41.

The fuel reforming system 70 is provided with a first fuel supply device 81 for supplying fuel from the fuel tank 1 to the startup combustor 11, a second fuel supply device 82 for supplying fuel from the fuel tank 1 to the reformer 4, a first air supply device 83 for supplying air from the outside of the fuel reforming system to the startup combustor 11, a second air supply device 84 for supplying air to the reformer 4 from the outside of the fuel reforming system and a water supply device 85 for supplying water to the reformer 4 from a water tank (not shown).

The first fuel supply device 81 is provided with a pump 12 which pumps fuel from a fuel tank 1 and a fuel injector 13 which injects the fuel to the startup combustor 11. The second fuel supply device 82 is provided with a pump 2 which pumps fuel from a fuel tank 1 and a fuel injector 3 which injects the fuel to the reformer 4. The first air supply device 83 is provided with an air compressor 14 which supplies air while controlling the flow amount of air. The second air supply device 84 is provided with a flow control valve 10 which controls the flow amount of air and an air compressor 9 which supplies air. The water supply device 85 is provided with a pump 7 which pumps water from the water tank (not shown) and a water injector 8 which injects water to the reformer 4.

The controller 20 is provided with a microcomputer comprising a central processing unit (CPU), a read only memory (ROM), a random access memory (RAM) and an input/output interface (I/O interface). The controller 20 controls the flow control valve 10, the fuel injector 3, the water injector 8 so as to regulate the flow amount of water, air and fuel supplied to the reformer 4. The controller 20 also controls the pump 12, the fuel injector 13, the air compressor 14 and the spark plug 15 based on the temperature of various reactors such as the reformer 4 and the load condition of the fuel cell stack 41.

When reforming gasoline, the generally applicable temperature range for the reformer, the shift converter and the CO oxidizer is respectively greater than or equal to 650° C., 200 to 450° C. and 80 to 250° C.

Fuel reforming systems which frequently perform startup and stopping of the system such as an automobile fuel reforming system encounter considerable problems in increasing the temperature of respective reformers as rapidly as possible to the applicable temperature range. One method of increasing the temperature of the reactor rapidly comprises producing a large amount of combustion heat in the startup combustor 11 provided in the fuel reforming system 70 and supplying the heat to a downstream reactor.

As shown in FIG. 1, fuel from the fuel tank 1 is supplied to the startup combustor 11 via a pump 12 and a fuel injector 13. Air is supplied by an air compressor 14. Fuel is combusted in the startup combustor 11 by igniting the fuel with a spark plug 15. The combustion gas produced in the startup combustor 11 is supplied to a downstream reformer 4, the shift converter 5 and the CO oxidizer 6 for warm-up operations.

When the resulting amount of heat is excessive, the interior of the startup combustor 11 will undergo excessive heating resulting in the production of nitrogen oxides (NOx). As a result, the conventional technique suppresses the combustion temperature to a temperature at which NOx is not produced.

In order to eliminate the above restriction on the combustion temperature, this invention provides an NOx trap 16 for adsorbing (or absorbing) NOx. The NOx trap 16 is provided upstream of the fuel cell stack 41, preferably upstream of the CO oxidizer 6 and it comprises an NOx trap material which adsorbs NOx. In the first embodiment, the NOx trap 16 is provided between the reformer 4 and the shift reactor 5. The NOx trap 16 adsorbs NOx included in the combustion gas to warm up the reformer 4. The adsorbed NOx is reduced and decomposed by using gases displaying reducing characteristics in the reformate gas produced immediately after completion of warm up, that is to say, by using carbon monoxide (CO) gas and hydrogen ($H_2$) gas. In this manner, the startup combustor 11 is allowed to perform combustion operations in a temperature range in which NOx would be produced. Normally the threshold temperature which is the lower limiting temperature of the temperature range in which NOx is produced is approximately 950° C. irrespective of the type of fuel used.

Since an NOx trap is provided so as to adsorb NOx in the the combustion gas or reformate gas downstream of the startup combustor 11 in the fuel reforming system 70, NOx produced by combustion in the startup combustor 11 at temperatures greater than about 950° C. can be eliminated. Likewise, at temperatures of less than about 950° C., NOx produced due to localized increases in the combustion temperature resulting from non-uniform combustion can be eliminated by the NOx trap 16 from the combustion gas discharged from the startup combustor 11. Since NOx adsorbed by the NOx trap 16 can be decomposed by carbon monoxide and hydrogen in the reformate gas produced immediately after completion of the warm-up operation, the reformer 4 can be rapidly started using high-temperature combustion gas without resulting in NOx emissions to the fuel cell stack 41.

Now the NOx trap 16 will be described in detail below.

The NOx trap 16 is provided with an NOx trap material which traps NOx. The NOx trap material comprises a precious metal or a transition metal (or both) as a catalyst. Furthermore, the NOx trap material comprises an alkali metal or an alkaline-earth metal, (or both) as an NOx adsorbent. The precious metal may be platinum (Pt), rhodium (Rh), paladium (Pd) or ruthenium (Ru). The transition metal may be copper (Cu), nickel (Ni), or cobalt (Co). The alkali metal may be lithium (Li), sodium (Na), kalium (K) or cesium (Cs). The alkaline-earth metal may be magnesium (Mg), calcium (Ca), strontium (Sr) or barium (Ba).

The NOx adsorption mechanism is as follows: (a) NO, $NO_2$ molecules are adsorbed on the surface of the transition metal or the precious metal; (b) the NOx which has become highly oxidized by the oxidizing effect of the transition metal or the precious metal adheres to the surface of the precious metal or the transition metal; (c) the NOx which has become highly oxidized with x larger than 2 by the oxidizing effect of the transition metal or the precious metal undergoes ion-mediated bonding with the alkali or alkaline-earth metal, for example in the form of $K(NO_3)$ or $Ba(NO_3)_2$.

According to spectroscopic analysis of the adhering NOx using a Fourier Transform Infrared. Spectrometer (FTIR), several adsorbed species of NOx exist, depending on the temperature of the NOx trap material, the conditions on the surface of the NOx trap material and the concentration of oxygen in the surrounding gases. Thus, considerable difficulty is encountered in specifying the state of such NOx.

In the temperature range of about 100° C. to 550° C., the NOx trap material can adsorb NOx. At a temperature less than approximately 100° C., adsorption of NOx on the surface of the NOx trap material is hindered due to the presence of condensed water on the surface of the NOx trap material. At a temperature greater than 550° C., the thermal energy in the adsorbed NOx exceeds the adsorption energy of NOx with respect to the surface of the NOx trap material, resulting in dissociation of NOx from the surface. Furthermore species of ion-mediated adsorption. (e.g. $NO_3$—) become thermally unstable and is discharged as NO or $NO_2$.

The adsorbed NOx is reduced and decomposed by a reducing gas contained in the reformate gas, that is to say, by hydrogen (H2) gas or carbon monoxide (CO) gas. Since NOx is adsorbed in various ways, numerous reaction pathways are present. An example of a reducing reaction for NOx is shown below.

$$NO_2 + 2CO \rightarrow \tfrac{1}{2}N_2 + 2CO_2$$

$$NO_2 + 2H_2 \rightarrow \tfrac{1}{2}N_2 + 2H_2O$$

The present inventors have experimentally confirmed that these reactions are promoted at greater than 150° C.

The decomposition of the adsorbed NOx using reduction reactions in the fuel reforming system 70 will be described in detail below.

The total amount of $H_2$ gas and CO gas for decomposing adsorbed NOx is a substantially fixed value from the outlet of the reformer 4 to the inlet of the CO oxidizer 6. This is due to the fact that theoretically CO gas produced in the reformer 4 is transformed into $CO_2$ gas while producing an equal number of moles of $H_2$ via a shift reaction. When a normal fuel is used, the total concentration of $H_2$ gas and CO gas in the reformate gas for reducing NOx adsorbed by the NOx trap material is 25–40% vol.

When an internal combustion engine is provided with a known NOx trap catalyst for purifying exhaust gas, the total concentration of $H_2$ gas and CO gas produced during rich-spike operations for decomposing adsorbed NOx is less than equal to 10% vol in the exhaust gas. This is due to the fact that performing rich-spike operations is difficult at an excess-air factor λ (=air-fuel ratio/stoichiometric ratio) of less than 0.7. The low concentration of $H_2$ gas and CO gas in the exhaust gas leads to insufficient decomposition of NOx when an internal combustion engine uses an NOx trap catalyst to purify exhaust gas. Therefore under normal conditions, 5–20% of the NOx flowing into the NOx trap catalyst is discharged downstream of the NOx trap catalyst.

Conversely, the concentration of gaseous reductant (CO and $H_2$) in the reformate gas produced by the reformer is 2–4 times larger than that in exhaust gas discharged from the internal combustion engine. When the NOx trap 16 is provided in the fuel reforming system 70, it is possible to obtain a decomposition efficiency for NOx which is approximately greater than 99%.

As shown above, startup operations for a fuel reforming system 70 are controlled by a controller 20. The flowchart shown in FIG. 2 describes a control routine executed during startup of a fuel reforming system 70. In the control routine, each step comprises one or more instructions which the controller 20 provides.

Figure 2:
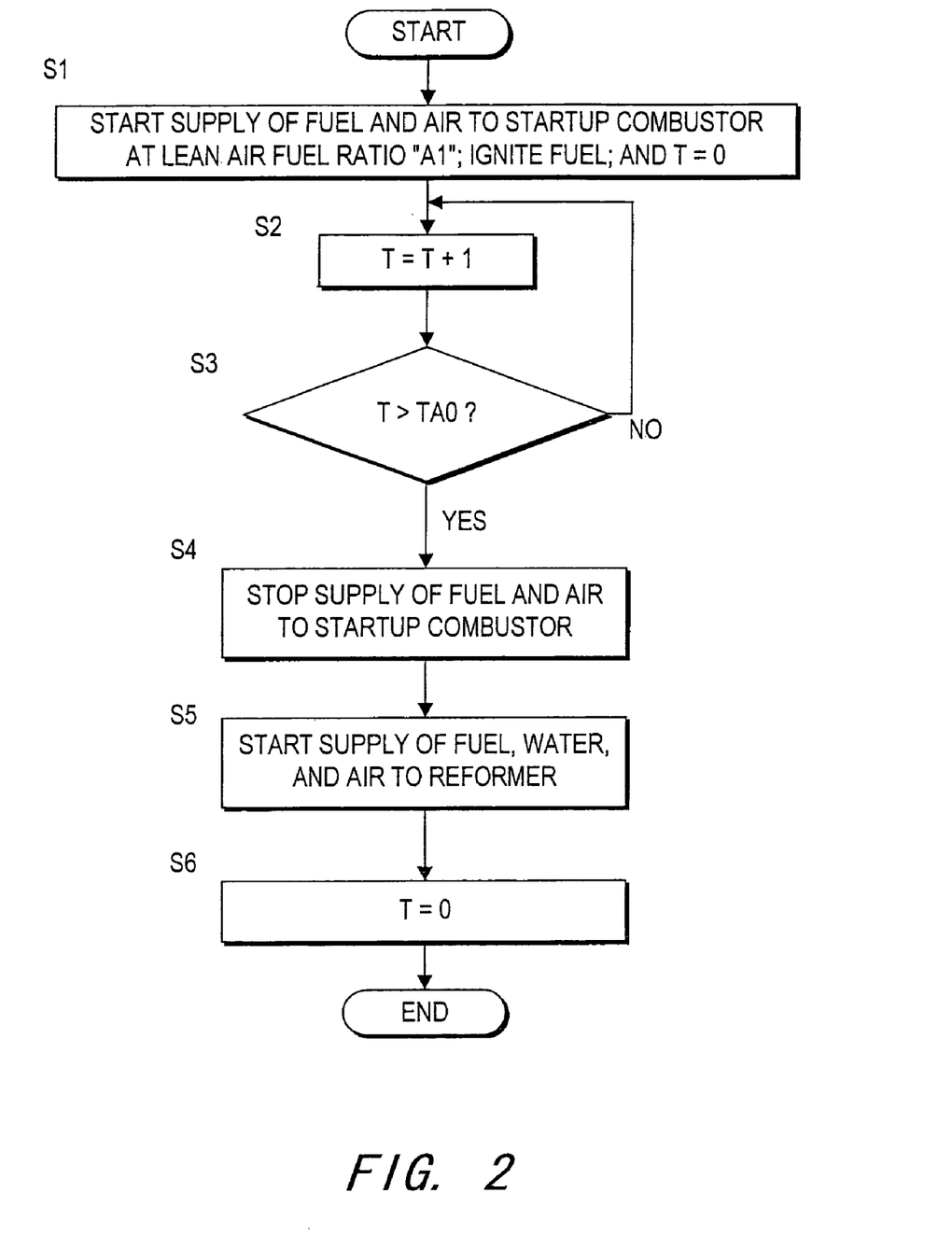
FIG. 2 is a flowchart showing a control routine executed by a controller according to a first embodiment.
Figure 5:
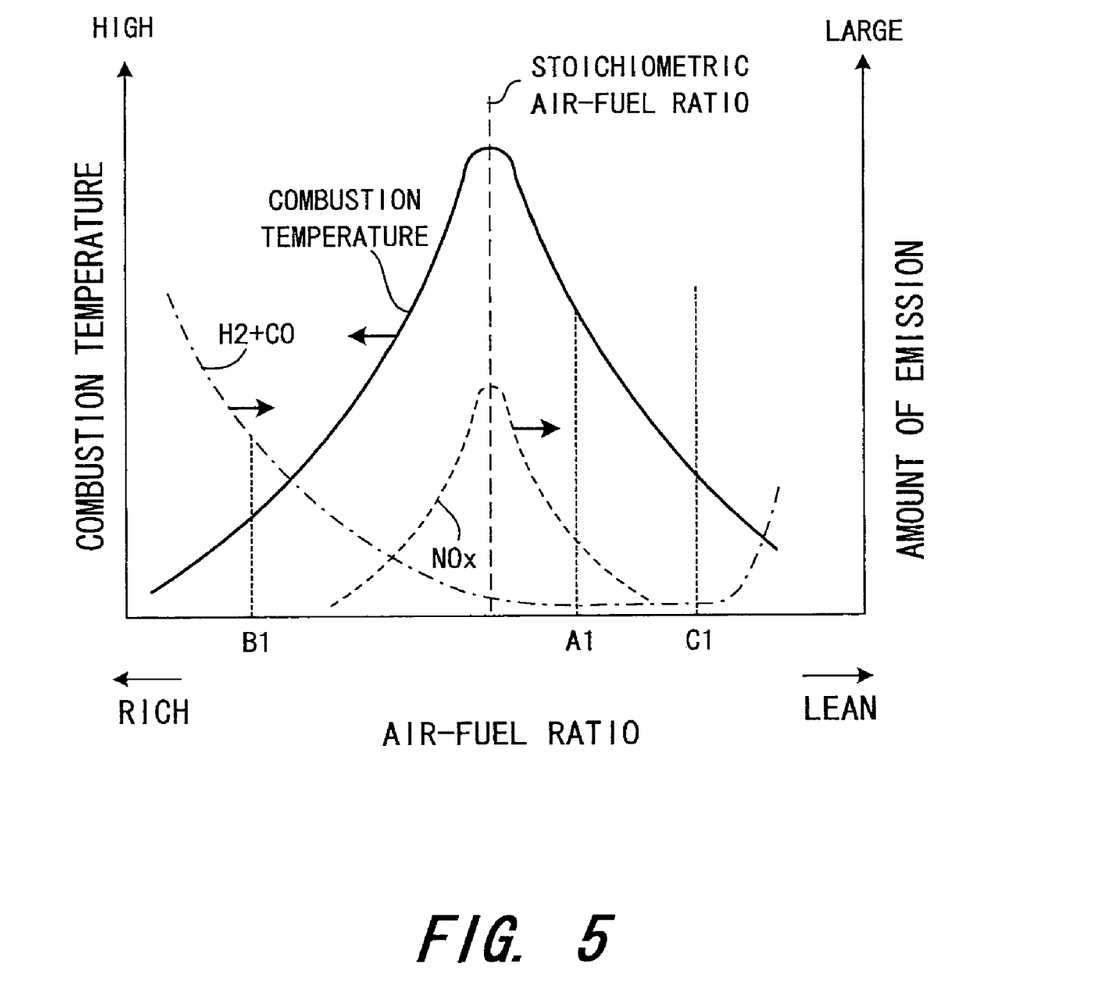
FIG. 5 is a graph showing the relationship of the combustion temperature to the air fuel ratio, the relationship of the discharge amount of NOx to the air fuel ratio, and the relationship of the overall discharge amount of H2 and CO to the air fuel ratio.

Firstly in a step S1, combustion is started in the startup combustor 11. Here, the pump 12 is commanded to pump fuel from the fuel tank 1 and the compressor 14 is commanded to supply air to the startup combustor 11. The fuel injector 13 is commanded to inject fuel into the startup combustor 11. A spark plug 15 is command to ignite the fuel. As a result, the fuel is combusted in the startup combustor 11. Here, the initial value of the variable T expressing an elapsed time is set to zero. At this time, the supplied amounts of fuel and air are regulated by the controller 20 so that the temperature of combustion is higher than the threshold temperature above which NOx is produced. The threshold temperature takes a value of approximately 950° C. irrespective of the type of fuel. For example, the combustion temperature is controlled to a target combustion temperature of 1050° C. which is 100° C. higher than the threshold temperature. From the point of view of air fuel ratio control, the flow amount of air and fuel is controlled in order to realize a lean air fuel ratio A1 which can realize the target combustion temperature of 1050° C. shown by the graph in FIG. 5. Referring to FIG. 5, at the lean air fuel ratio A1, CO and H2 are substantially not present in the combustion gas.

Thus high-temperature combustion gas is introduced into the reformer 4 to rapidly increase the temperature of the reformer 4. Since the temperature of the combustion gas is controlled to a temperature (e.g. 1050° C.) higher than the threshold temperature as described above, reactions occur between oxygen and nitrogen in the air resulting in the formation of NOx. However such NOx is eliminated by the NOx trap 16 provided downstream of the startup combustor 11 and thus NOx can be prevented from being discharged downstream of the NOx trap 16.

Then in a step S2, a variable T expressing time is incremented by a value of one. The variable T measures the elapsed time after the initiation of warm-up operations in the step S1. The value of the variable T is incremented by a value of one per unit time. When the unit time is one second, the counter T increases each second.

In a step S3, it is determined whether or not the variable T expressing time is greater than a first predetermined time TA0. When the variable T is smaller than or equal to the first predetermined time TA0, the routine returns to a step S2. When the variable T is greater than the first predetermined time TA0, the routine proceeds to a step S4. The first predetermined time TA0 represents the required time for warming up the reformer 4, the shift converter 5 and the CO oxidizer 6 using the combustion gas and it depends on factors such as the amount of heat produced by the startup combustor 11, the heat capacity of the reactors and startup combustor 11, and the target temperature of the inlet of the CO oxidizer 6. Above the target temperature, the CO oxidizer 6 can successfully removes CO. For example, the first predetermined time TA0 is about 90 seconds for the fuel reforming system which is used for a fuel cell stack with a rated output of 65 kW and has the target temperature of the inlet of the CO oxidizer 6 of 120° C. The first predetermined time TA0 is determined in advance by experiment and is stored in the memory of the controller 20.

When the warm-up operation for every reactor is completed (the predetermined time TA0 has elapsed), the routine proceeds to a step S4 where the supply of fuel and air to the startup combustor 11 is stopped. Here, the fuel injector 13 is commanded to stop injecting fuel and the air compressor 14 is commanded to stop its operation. Then in a step S5, air, water and fuel are supplied to the reformer 4 and reformate reactions are commenced. Here, the pumps 2, 7 and the air compressor 9 are commanded to start operating, the flow control valve 10 is commanded to open, the fuel injector 3 is commanded to start injecting fuel to the reformer 21, and the water injector 8 is commanded to start injecting water to the reformer 21.

Since the reformate gas produced by the reformer 4 is supplied to the NOx trap 16, NOx adsorbed by the NOx trap material of the NOx trap 16 is reduced and decomposed by the CO gas and H2 gas present in the reformate gas.

In a step S6, the variable T is initialized to a value of zero and the control routine is terminated.

Figure 3:
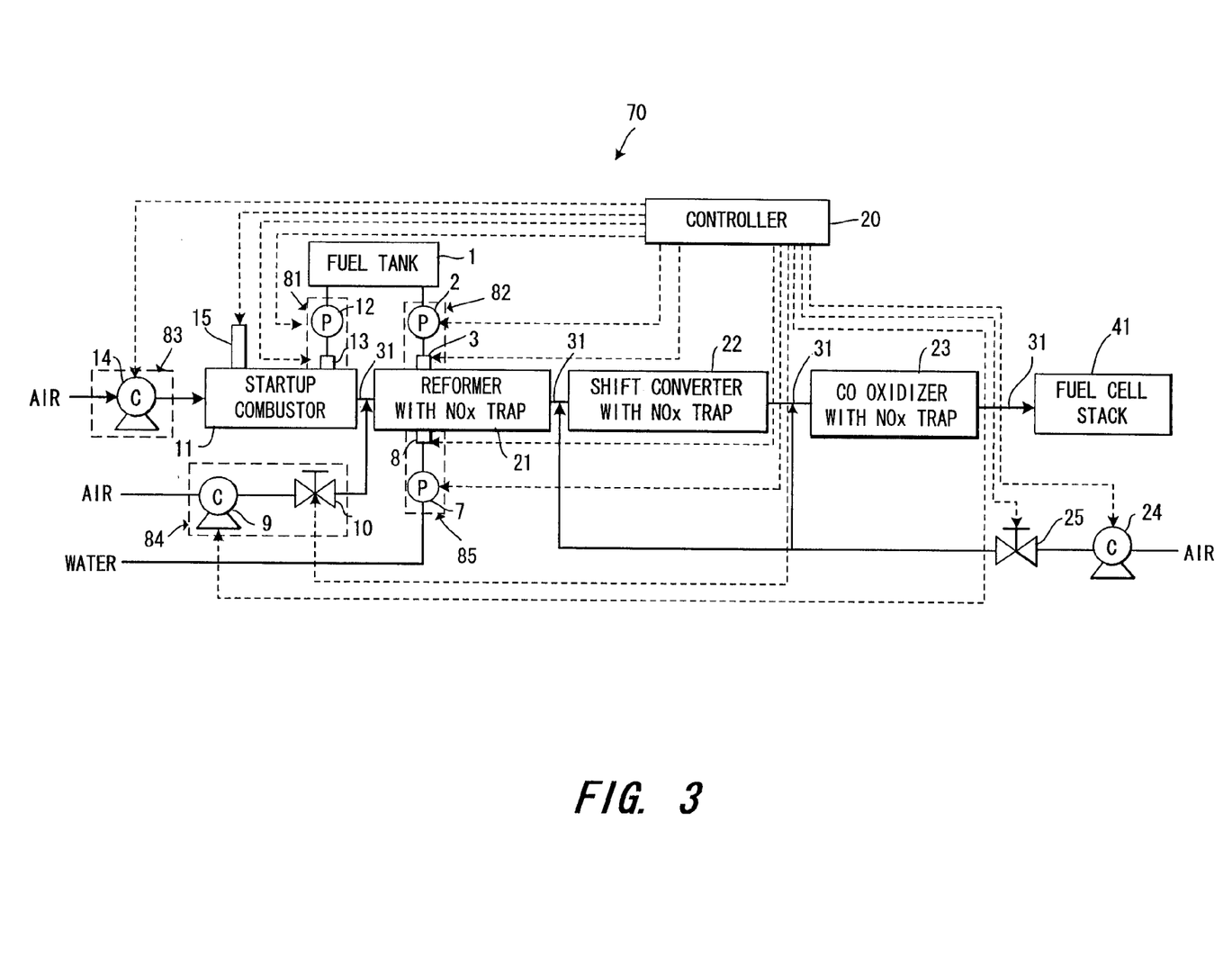
FIG. 3 is a schematic diagram showing a fuel reforming system according to a second embodiment.

Referring to FIG. 3, a second embodiment of this invention will be described. In the first embodiment, warm-up operations for reactors were performed using only the heat of combustion gas supplied from the startup combustor 11. However in the second embodiment, in addition to using the heat of combustion gases, warm-up operations for each reactor are performed by producing heat inside each reactor resulting from oxidation reactions of CO and $H_2$ in the combustion gas with oxygen. The combustion gas from the startup combustor 11 can contain gaseous CO and $H_2$ by enriching the air fuel ratio in the startup combustor 11. Since identical components are designated by the same reference numerals in the first and the second embodiments, additional description will be omitted with respect to these components.

In this embodiment, an NOx trap comprising an NOx trap material which adsorbs NOx is provided in at least one of the reformer 4, the shift converter 5 and the CO oxidizer 6. In FIG. 3, an NOx trap comprising an NOx trap material is provided in all of the reformer 4, the shift converter 5 and the CO oxidizer 6. The NOx trap material may be mixed with a catalyst of each reactor and disposed in each reactor. Thus since each reactor has an NOx trapping function, reactions of gaseous CO and $H_2$ with oxygen in the reactors can be initiated at a lower temperature than when the reactors do not trap NOx. This is due to the fact that the startup temperature of oxidizing reaction is lower when NOx (x>2) is adsorbed in the NOx trap material than when oxygen is present only in gaseous phase. In contrast to normal gaseous oxygen, oxygen contained in the adsorbed NOx (x>2) is activated because N—O bonding is weak due to the interaction of NOx with electrons on the surface of the NOx trap material. Thus the adsorbed NOx serves as a source of activated oxygen. Furthermore NOx is generally unstable when the value "x" for oxygen is large and oxygen displays a tendency to disassociate. Consequently such forms of NOx act as strong oxidizing agents. For example, the nitrate ion $NO_3^-$ bonded with the NOx adsorbent acts as a strong oxidizing agent.

On the other hand, apart from warming up using the heat of combustion gas, there is the method of warming up reactors by introducing gaseous CO and $H_2$ into the reactors and introducing air containing a required amount of oxygen for oxidizing $H_2$ and CO in the respective reactors.

Thus the reactor is rapidly warmed by the heat of oxidizing reactions occurring in the reactor. First, CO and $H_2$ contained in the combustion gas react with oxygen using NOx as an oxidizing agent. Subsequently, CO and $H_2$ contained in the combustion gas react with oxygen using air as an oxidizing agent. The air compressor 24 supplies air through a flow control valve 25 to the shift converter 22 and the CO oxidizer 23. Starting oxidizing reactions at lower temperatures due to the presence of adsorbed NOx acting as a source of activated oxygen leads to rapid warming up operations.

Figure 4:
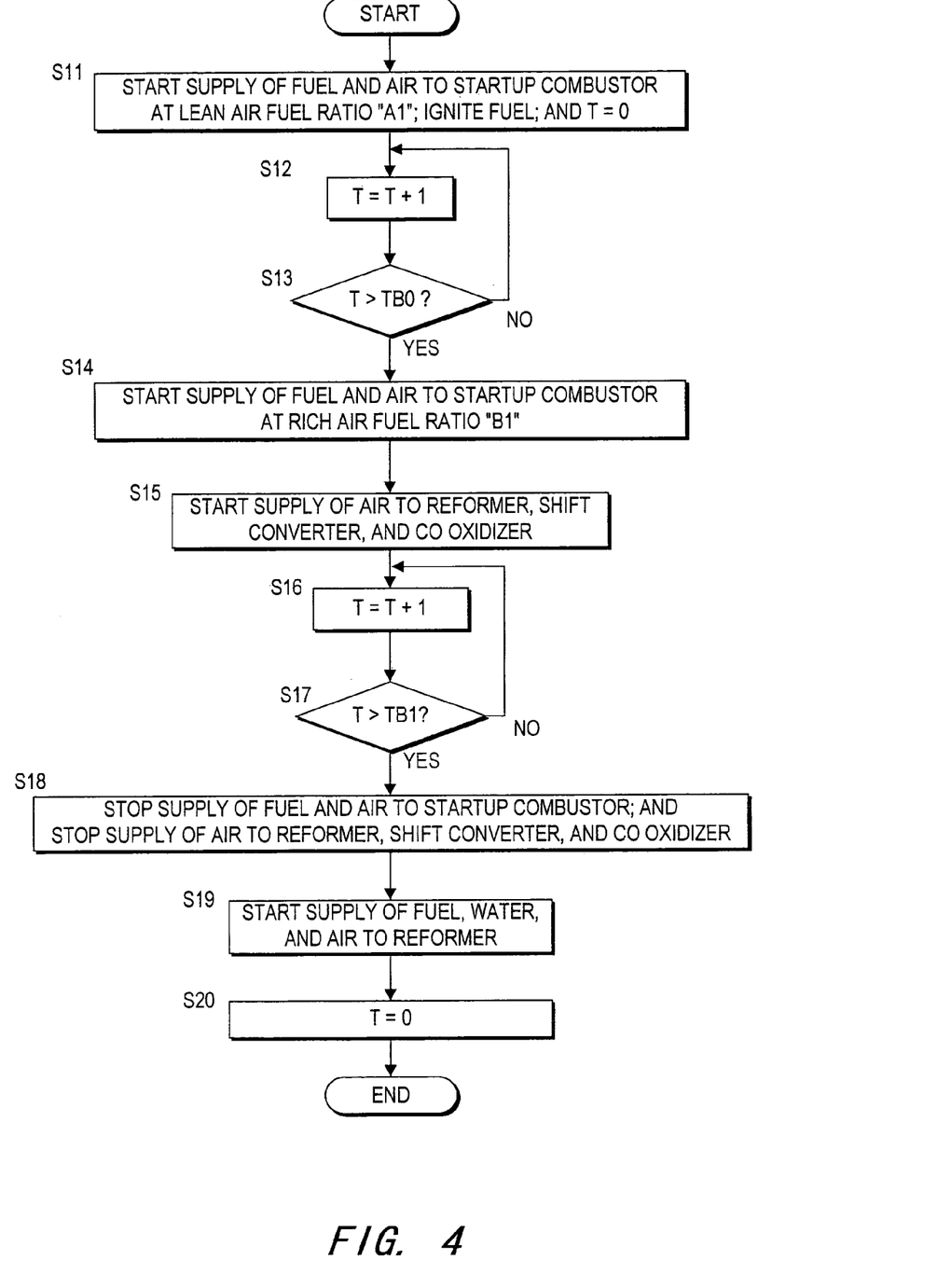
FIG. 4 is a flowchart showing a control routine executed by a controller according to a second embodiment.

Referring to the flowchart in FIG. 4, a control routine executed by the controller 20 according to a second embodiment will be described.

Firstly in a step S11, combustion is started in the startup combustor 11. Here, the pump 12 is commanded to supply fuel from the fuel tank 1 and the compressor 14 is commanded to supply air to the startup combustor 11. The fuel injector 13 is commanded to inject fuel into the startup combustor 11. This fuel is ignited by a spark plug 15. In this manner, the fuel is combusted. Here, the initial value of the variable T expressing an elapsed time is set to zero. At this time, the air fuel ratio is controlled to an air fuel ratio of A1 as shown in FIG. 5. At the air fuel ratio A1 is lean, the temperature of combustion is higher than 950° C.

Thus high-temperature combustion gas is introduced into the reformer 21 and the temperature of the reformer 21 is rapidly increased by the heat of the combustion gas. Since the combustion temperature in the startup combustor 11 is high, reactions occur between oxygen and nitrogen in the air resulting in the formation of NOx in the combustion gas. However such NOx is reduced by the reformer 21, shift converter 22 and CO oxidizer which have an NOx adsorbing function and are provided downstream of the startup combustor 11. Thus it is possible to prevent NOx from being discharged to the fuel cell stack 41.

Then in a step S12, a variable T expressing time is incremented by a value of one. In a step S13, the elapsed time T after the initiation of startup operations in a step S11 is compared with a second predetermined time TB0. When it is determined that the elapsed time T is smaller than the predetermined time TB0, the routine returns to a step S12. When the elapsed time T is greater than the second predetermined time TB0, the routine proceeds to a step S14. The value of TB0 is determined in advance by experiment and is stored in the memory of the controller 20. The second predetermined time TB0 represents the time until reaching a temperature at which the reformer 21, the shift converter 22 and the CO oxidizer 23 which have adsorbed NOx can oxidize H2 and CO. If each reactor is not provided with an NOx trap material, the time TB1 for all reactors to reach their respective temperature at which oxidizing reactions of H2 and CO are enabled is longer than when each reactor is provided with an NOx trap material. The time TB1 is stored in the memory of the controller 20 and used as a third predetermined time TB1 in the step S17 below. The time TB1 depends on factors such as the amount of heat produced by the startup combustor 11, the heat capacity of the reactors and startup combustor 11, and the target temperature of the inlet of the CO oxidizer 6. The time TB1 is about 70 seconds for the fuel reforming system used for a fuel cell stack with a rated output of 65 kW.

In a step S14, the combustion state of the startup combustor 11 is switched to a rich combustion state at an air fuel ratio B1 as shown in FIG. 5 from the lean air fuel ratio A1. Here, the controller 20 controls the amounts of fuel and air supplied to the startup combustor 11 using the fuel injector 13 and the air compressor 14. In this manner, the supply amount of $H_2$ gas and CO gas to the startup combustor 11 is increased. The NOx adsorbed by the NOx trap material functions as a source of activated oxygen and produces reactions of $H_2$ and CO with oxygen on the NOx trap material.

In a step S15, the air compressor 9 and the flow control valve 10 are commanded to start supplying air to the reformer 21, and the air compressor 24 and the flow control valve 25 are commanded to start supplying air to the shift converter 22 and the CO oxidizer 23. Here, the oxidizing reactions are further promoted in each reactor by supplying air from a section upstream of the respective reactors in order to further increase the heat of oxidizing reactions.

If NOx was not adsorbed in each reactor due to absence of the NOx trap material, the temperature of each reactor at this step would be a temperature at which oxidation reactions do not occur. However in this embodiment, since NOx is adsorbed on the NOx trap material in each reactor, the minimum temperature for producing oxidizing reactions is reduced by about 20° C. Though the minimum temperature for producing oxidizing reactions between $H_2$ and gaseous $O_2$ is about 120° C., the minimum temperature for producing oxidizing reactions between $H_2$ and oxygen of the adsorbed NOx is about 100° C. Likewise, though the minimum temperature for producing oxidizing reactions between CO and gaseous $O_2$ is about 150° C., the minimum temperature for producing oxidizing reactions between CO and oxygen of the adsorbed NOx is about 130° C. As a result, in the step S15, oxidizing reactions start in each reactor. This allows the warm-up time for each reactor to be shortened. When the fuel reforming system 70 performs reformate operations, the decomposition of NOx is promoted irrespective of the operating conditions.

In a step S16, the variable T expressing an elapsed time is incremented by a value of one. In a step S17, it is determined whether or not the elapsed time T after initiating the warm-up operations in the step S11 is greater than a third predetermined time TB1. When the elapsed time T is smaller than or equal to the third predetermined time TB1, the routine returns to the step S16. When the elapsed time T is greater than the third predetermined time TB1, the routine proceeds to a step S18. In the step S18, since the warming up operations for each reactor are completed, the supply of air and fuel to the startup combustor 11 is stopped. Here, the fuel injector 13 is commanded to stop injecting fuel and the air compressor 14 is commanded to stop supplying air. The supply of air to each reactor 21, 22, 23 is also stopped by commanding the flow control valve 10 and the flow control valve 25 to close.

Next, in a step S19, the required amounts of fuel, air and water for reformate operations is supplied to the reformer 21 and reforming operation are initiated. Here, the pumps 2, 7 and the air compressor 9 are commanded to start operating, the flow control valve 10 is commanded to open, the fuel injector 3 is commanded to start injecting fuel to the reformer 21, and the water injector 8 is commanded to start injecting water to the reformer 21.

During reforming operations, residual NOx on the NOx trap material is decomposed by the $H_2$ and CO produced by the reformer 21.

In a step S20 the variable T is initialized to a value of zero and the control routine is terminated.

In the second embodiment, an NOx adsorbing function has been provided in each reactor 21, 22, 23. However it is not required to provide all the reactors with this function and for example, only the reformer 21 may be provided with the adsorbing function.

In the second embodiment, the controller 20 switches the combustion state of the startup combustor 11 in response to the elapsed time after starting combustion, that is to say, in response to the NOx trap temperature which increases with the elapsed time. In this manner, it is possible to prevent NOx emissions from the reforming system as a result of NOx not being removed by adsorption. If each reactor is provided with a temperature sensor to measure the temperature of the NOx trap, the controller 20 may control the operation of the startup combustor 11 in response to the directly measured temperature of the NOx trap in the similar manner to the control routine shown in the routine in FIG. 4.

Figure 6:
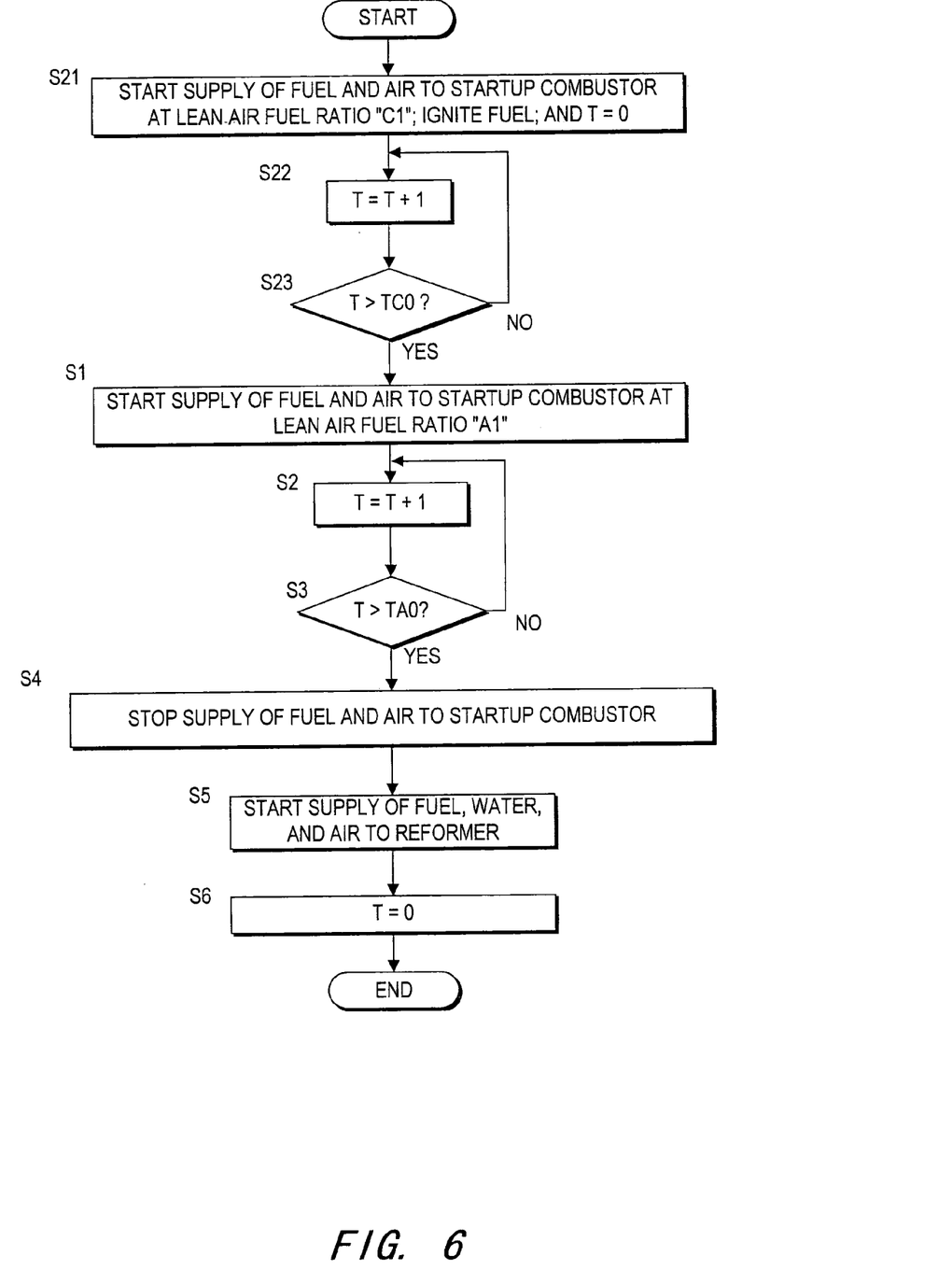
FIG. 6 is a flowchart showing a control routine executed by a controller according to a third embodiment.

Referring to a flowchart in FIG. 6, a control routine executed by the controller 20 according to a third embodiment will be described. The structure of the fuel reforming system is the same as the first embodiment.

The third embodiment has the object of reducing NOx emissions from the startup combustor 11 immediately after starting the startup combustor 11. At temperatures of approximately less than 100° C., moisture is adsorbed in the NOx trap. Consequently there is the possibility that the NOx trap will not be able to adsorb NOx in a preferred manner. Thus the startup combustor 11 performs low-temperature combustion which discharges low amounts of NOx until the NOx trap reaches a predetermined temperature of approximately 100° C. After the NOx trap exceeds the predetermined temperature of approximately 100° C., the startup combustor 11 performs the same control routine as the first embodiment.

In a step S21, fuel and air are supplied to the startup combustor 11 and the fuel is ignited by a spark plug 15 in a manner similar to the step S1 and S11. Here, the initial value of the variable T expressing time is set to zero. Then in a step S22, the variable T is incremented by one. The air fuel ratio at this time is controlled to coincide with the air fuel ratio C1 shown in FIG. 5. It should be noted that the air fuel ratio C1 is leaner than the air fuel ratio A1 with the result that combustion itself becomes unstable and difficult to control. However unstable combustion is only performed for a fourth predetermined short time TC0. The fourth predetermined time TC0 represents the required time for increasing the temperature of the NOx trap 16 to a temperature at which the NOx trap material eliminates condensed water, that is to say, the time that has elapsed after initiating startup operation until a temperature of the NOx trap 16 reaches approximately 100° C. The amount of NOx produced under these combustion conditions is small in comparison to combustion at an air fuel ratio A1 due to the low combustion temperature.

In a step S23, it is determined whether or not the variable T which expresses the elapsed time after initiating warm-up operations is greater than the fourth predetermined time TC0. When the variable T which expresses the elapsed time is smaller than the fourth predetermined time TC0, the routine returns to a step S22. When the variable T which expresses elapsed time is greater than the fourth predetermined time TC0, the routine proceeds to a step S1. The subsequent steps after S1 are the same as the steps S1–S6 in the flowchart in FIG. 2 which show the control routine according to the first embodiment. Therefore additional description will be omitted.

In this manner, until warm-up operations for the NOx trap material are completed, NOx emissions can be reduced in a fuel reforming system which further reduces NOx emissions from the startup combustor 11 by using lean combustion at an air fuel ratio C1.

In a third embodiment, the controller 20 switches the combustion state of the startup combustor 11 in response to the elapsed time after starting combustion, that is to say, with increase in the temperature of the NOx trap so that NOx emissions from the reforming system 70 are prevented by adsorption. If each reactor is provided with a temperature sensor to measure the temperature of the NOx trap, the controller 20 may control the operation of the startup combustor 11 in response to the directly measured temperature of the NOx trap in a manner similar to the control shown in the routine in FIG. 4.

Figure 7:
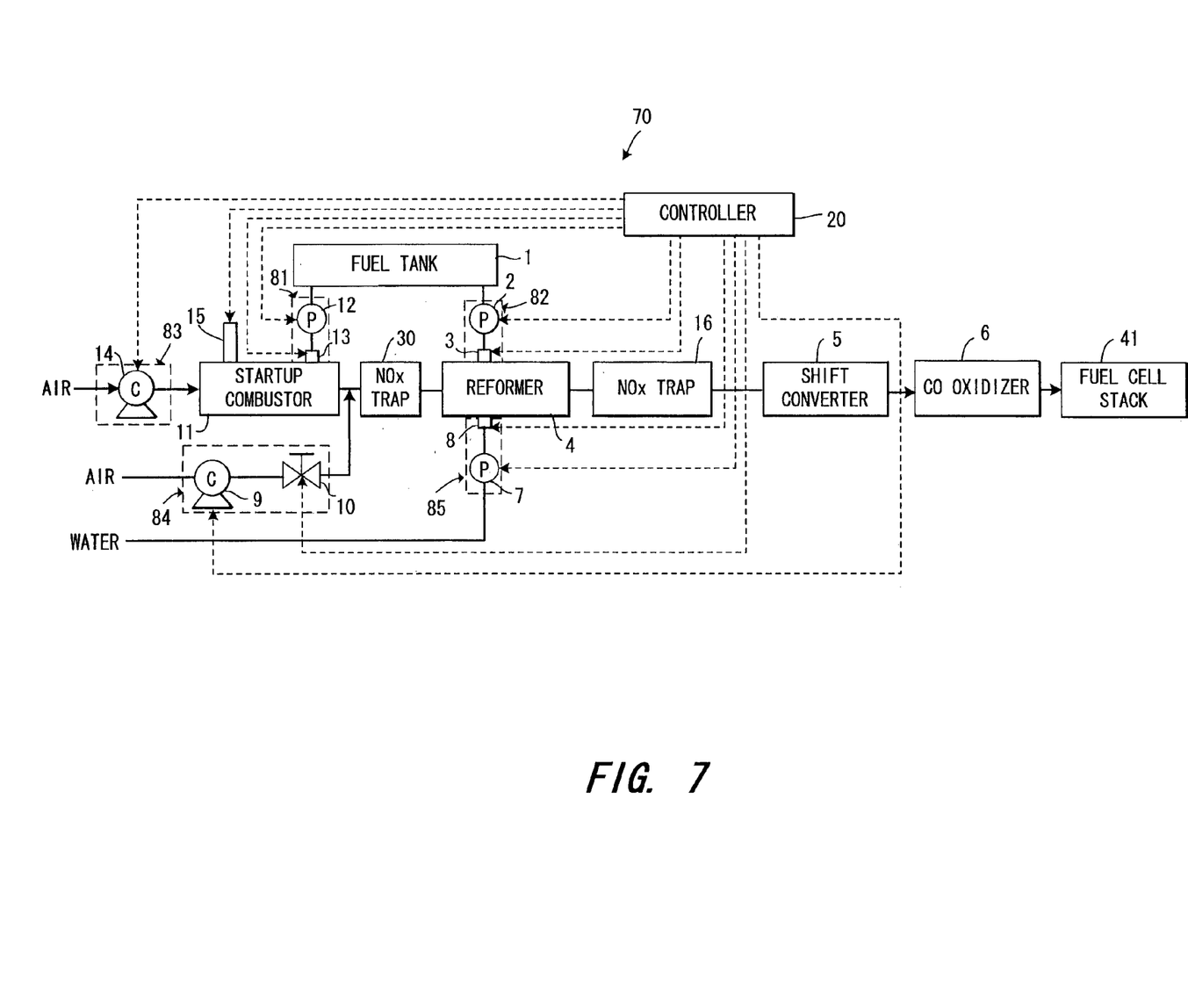
FIG. 7 is a schematic diagram showing a fuel reforming system according to a fourth embodiment.

Referring to FIG. 7, a fourth embodiment will be described. The fourth embodiment adds a second NOx trap 30 to the first embodiment. The second NOx trap 30 is disposed between the startup combustor 11 and the reformer 4. That is to say, NOx traps are respectively provided immediately downstream of the startup combustor 11 and immediately downstream of the reformer 4.

The first NOx trap 16 is provided between the reformer 4 and the shift converter 5. Immediately after initiating warm-up operations for the fuel reforming system 70, high-temperature combustion gas flows directly into the second NOx trap 30 provided immediately downstream of the startup combustor 11. The second NOx trap 30 rapidly adsorbs the NOx. At the same time, the NOx trap material in the first NOx trap 16 which is downstream of the second NOx trap 30 is warmed by combustion gas which does not contain NOx. If the temperature of the second NOx trap 30 exceeds a temperature of 500–550° C. which is the maximum temperature below which NOx can be adsorbed, adsorbed NOx will be discharged downstream of the second NOx trap 30. Therefore the fuel reforming system 70 is adapted so that the NOx trap material of the first NOx trap 16 reaches a temperature of greater than approximately 100° C. before the temperature of the second NOx trap 30 exceeds a temperature of 500–550° C. At a temperature of approximately greater than 100° C., since moisture adsorbed by the NOx trap material of the first NOx trap 16 is eliminated, the first NOx trap 16 can remove NOx by adsorption. In this manner, NOx emissions from the reforming system 70 are effectively removed using the two NOx traps. The NOx adsorbed in the second NOx trap 30 is decomposed by the reformate gas produced by the reformer 4 as in the case of the first NOx trap 16 after the completion of warm-up operations because the gas passage 31 allows flow of the reformate gas from the reformer 4 to the second NOx trap 30.

In the above embodiments, a fuel reforming system 70 generates a reformate gas rich in $H_2$ and supplies the reformate gas to the fuel cell stack 41. However the fuel reforming system is not limited to a fuel cell, and it is possible to supply reformate gas to a equipment using a reformate gas rich in $H_2$.

This invention can clearly be applied to reforming systems with different structures from that described in the embodiments above. For example, it is possible to apply this invention to a reforming system with a different combination of type of reactor.

The entire contents of Japanese Patent Application P2001-350997 (filed Nov. 16, 2001) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

INDUSTRIAL APPLICABILITY

This invention can be applied to a fuel reforming system which includes a source of NOx such as a combustor, resulting in a reduction of NOx in a reformate gas discharged from the fuel reforming system. The fuel reforming system according to this invention can supply hydrogen gas without NOx to equipment such as a fuel cell.

The invention claimed is:

1. A fuel reforming system having a reformer for reforming fuel to produce a reformate gas containing hydrogen ($H_2$) gas and carbon monoxide (CO) gas; a shift converter for reacting carbon monoxide contained in the reformate gas with water ($H_2O$) to produce hydrogen; a CO oxidizer which removes CO gas from the reformate gas discharged from the shift converter and supplies the reformate gas to equipment using hydrogen gas; a startup combustor for supplying combustion gas to the reformer, the shift converter and the CO oxidizer so as to warm-up the fuel reforming system; and a gas passage allowing flow of combustion gas/reformate gas, the gas passage extending to the equipment using hydrogen gas from the startup combustor through the reformer, the shift converter and the CO oxidizer; the fuel reforming system comprising:

a first fuel supply device for supplying fuel to the startup combustor;

a second fuel supply device for supplying fuel to the reformer;

an air supply device for supplying air to the startup combustor;

a spark plug for igniting fuel supplied to the startup combustor;

an NOx trap disposed between the startup combustor and the equipment using hydrogen gas, the NOx trap adsorbing nitrogen oxides in the combustion gas; and a controller for controlling a warm-up operation of the fuel reforming system, the controller having functions of:

commanding the air supply device to supply air to the startup combustor;

commanding the first fuel supply device to supply fuel to the startup combustor;

commanding the spark plug to ignite fuel in the startup combustor so as to initiate combustion in the startup combustor;

controlling a flow amount of air supplied to the startup combustor from the air supply device and a flow amount of fuel supplied to the startup combustor from the first fuel supply device, in response to a temperature of the NOx trap; and commanding the first fuel supply device to stop supplying fuel to the startup combustor after a first predetermined time has elapsed after initiating combustion, and then commanding the second fuel supply device to supply fuel to the reformer.

2. The fuel reforming system as defined in claim 1, wherein at least one member selected from the group consisting of the reformer, the shift converter and the CO oxidizer comprises the NOx trap.

3. The fuel reforming system as defined in claim 1, wherein the controller has the function of controlling the flow amount of air supplied to the startup combustor from the air supply device and the flow amount of fuel supplied to the startup combustor from the first fuel supply device at a first lean air fuel ratio (C1) until the NOx trap reaches a predetermined temperature, and at a second lean air fuel ratio (A1) after the NOx trap reaches the predetermined temperature, wherein the first air fuel ratio (C1) is leaner than the second air fuel ratio (A1).

4. The fuel reforming system as defined in claim 3, wherein the predetermined temperature is substantially equal to 100° C.

5. The fuel reforming system as defined in claim 1, wherein the NOx trap is disposed in the gas passage between the reformer and the shift converter.

6. The fuel reforming system as defined in claim 5, wherein another NOx trap is disposed in the gas passage between the reformer and the startup combustor.

7. The fuel reforming system as defined in claim 1, wherein the first predetermined time is the time required for warming up the shift converter, the reformer and the CO oxidizer.

8. The fuel reforming system as defined in claim 1, wherein nitrogen oxides adsorbed by the NOx trap are reduced by hydrogen (H$_2$) gas and carbon monoxide (CO) gas contained in the reformate gas.

9. The fuel reforming system as defined in claim 1, wherein the NOx trap is provided with an NOx trap material which comprises at least one member selected from the group consisting of a precious metal and a transition metal and which further comprises at least one member selected from the group consisting of an alkali metal and an alkali-earth metal.

10. A fuel reforming system having a reformer for reforming fuel to produce a reformate gas containing hydrogen (H$_2$) gas and carbon monoxide (CO) gas; a shift converter for reacting carbon monoxide contained in the reformate gas with water (H$_2$O) to produce hydrogen; a CO oxidizer which removes CO gas from the reformate gas discharged from the shift converter and supplies the reformate gas to equipment using hydrogen gas; a startup combustor for supplying combustion gas to the reformer, the shift converter and the CO oxidizer so as to warm-up the fuel reforming system; and a gas passage allowing flow of combustion gas/reformate gas, the gas passage extending to the equipment using hydrogen gas from the startup combustor through the reformer, the shift converter and the CO oxidizer; the fuel reforming system comprising:

a first fuel supply device for supplying fuel to the startup combustor;

a second fuel supply device for supplying fuel to the reformer;

an air supply device for supplying air to the startup combustor;

a spark plug for igniting fuel supplied to the startup combustor;

an NOx trap disposed between the startup combustor and the equipment using hydrogen gas, the NOx trap adsorbing nitrogen oxides in the combustion gas; and a controller for controlling a warm-up operation of the fuel reforming system, the controller having functions of:

commanding the air supply device to supply air to the startup combustor;

commanding the first fuel supply device to supply fuel to the startup combustor;

commanding the spark plug to ignite fuel in the startup combustor so as to initiate combustion in the startup combustor;

controlling a flow amount of air supplied to the startup combustor from the air supply device and a flow amount of fuel supplied to the startup combustor from the first fuel supply device, in response to the elapsed time after initiation of combustion in the startup combustor; and commanding the first fuel supply device to stop supplying fuel to the startup combustor after a first predetermined time has elapsed after initiating combustion, and then commanding the second fuel supply device to supply fuel to the reformer.

11. The fuel reforming system as defined in claim 10, wherein the controller has the function of controlling the flow amount of air supplied to the startup combustor from the air supply device and the flow amount of fuel supplied to the startup combustor from the first fuel supply device so that a lean air fuel ratio is produced until a second predetermined time elapses after the initiation of combustion by the startup combustor, and so that a rich air fuel ratio is produced after the second predetermined time elapses after the initiation of combustion by the startup combustor, the second predetermined time is shorter than the first predetermined time.

12. The fuel reforming system as defined in claim 11, wherein the second predetermined time is the elapsed time after the initiation of combustion by the startup combustor until a temperature of the NOx trap is reached to a temperature at which nitrogen oxides adsorbed by the NOx trap can oxidize hydrogen (H$_2$) gas and carbon monoxide (CO) gas.

13. The fuel reforming system as defined in claim 10, wherein the NOx trap is disposed in the gas passage between the reformer and the shift converter.

14. The fuel reforming system as defined in claim 13, wherein another NOx trap is disposed in the gas passage between the reformer and the startup combustor.

15. The fuel reforming system as defined in claim 10, wherein the first predetermined time is the time required for warming up the shift converter, the reformer and the CO oxidizer.

16. The fuel reforming system as defined in claim 10, wherein nitrogen oxides adsorbed by the NOx trap are reduced by hydrogen (H$_2$) gas and carbon monoxide (CO) gas contained in the reformate gas.

17. The fuel reforming system as defined in claim 10, wherein the NOx trap is provided with an NOx trap material which comprises at least one member selected from the group consisting of a precious metal and a transition metal and which further comprises at least one member selected from the group consisting of an alkali metal and an alkali-earth metal.

18. A control method for controlling a fuel reforming system, the fuel reforming system having a reformer for reforming fuel to produce a reformate gas containing hydrogen (H$_2$) gas and carbon monoxide (CO) gas; a shift converter for reacting carbon monoxide contained in the reformate gas with water (H$_2$O) to produce hydrogen; a CO oxidizer which removes CO gas from the reformate gas discharged from the shift converter and supplies the reformate gas to equipment using hydrogen gas; a startup combustor for supplying combustion gas to the reformer, the shift converter and the CO oxidizer so as to warm-up the fuel reforming system; an NOx trap disposed between the startup combustor and the equipment using hydrogen gas; and a gas passage allowing flow of combustion gas/reformate gas; the NOx trap adsorbing nitrogen oxides in the combustion gas, the gas passage extending to the equipment using hydrogen gas from the startup combustor through the reformer, the shift converter and the CO oxidizer;

the control method comprising:

supplying fuel to the startup combustor;

supplying air to the startup combustor;

igniting fuel supplied to the startup combustor;

controlling a flow amount of air supplied to the startup combustor from the air supply device and a flow amount of fuel supplied to the startup combustor from the first fuel supply device, in response to a temperature of the NOx trap;

stopping supplying fuel to the startup combustor after a first predetermined time has elapsed after initiating combustion; and supplying fuel to the reformer.

19. A fuel reforming system having a reformer for reforming fuel to produce a reformate gas containing hydrogen (H$_2$) gas and carbon monoxide (CO) gas; a shift converter for reacting carbon monoxide contained in the reformate gas with water (H$_2$O) to produce hydrogen; a CO oxidizer which removes CO gas from the reformate gas discharged from the shift converter and supplies the reformate gas to equipment using hydrogen gas; a startup combustor for supplying combustion gas to the reformer, the shift converter and the CO oxidizer so as to warm-up the fuel reforming system; and a gas passage allowing flow of combustion gas/reformate gas, the gas passage extending to the equipment using hydrogen gas from the startup combustor through the reformer, the shift converter and the CO oxidizer; the fuel reforming system comprising:

an NOx trap disposed between the startup combustor and the equipment using hydrogen gas, the NOx trap adsorbing nitrogen oxides in the combustion gas;

first means for supplying fuel to the startup combustor;

second means for supplying fuel to the reformer;

third means for supplying air to the startup combustor;

fourth means for igniting fuel supplied to the startup combustor; and fifth means for commanding the third means to supply air to the startup combustor;

sixth means for commanding the first means to supply fuel to the startup combustor;

seventh means for commanding the fourth means to ignite fuel in the startup combustor so as to initiate combustion in the startup combustor;

eighth means for controlling a flow amount of air supplied to the startup combustor from the air supply device and a flow amount of fuel supplied to the startup combustor from the first fuel supply device, in response to a temperature of the NOx trap;

ninth means for commanding the first means to stop supplying fuel to the startup combustor after a first predetermined time has elapsed after initiating combustion, and tenth means for commanding the second means to supply fuel to the reformer.

20. A control method for controlling a fuel reforming system, the fuel reforming system having a reformer for reforming fuel to produce a reformate gas containing hydrogen ($H_2$) gas and carbon monoxide (CO) gas; a shift converter for reacting carbon monoxide contained in the reformate gas with water ($H_2O$) to produce hydrogen; a CO oxidizer which removes CO gas from the reformate gas discharged from the shift converter and supplies the reformate gas to equipment using hydrogen gas; a startup combustor for supplying combustion gas to the reformer, the shift converter and the CO oxidizer so as to warm-up the fuel reforming system; an NOx trap disposed between the startup combustor and the equipment using hydrogen gas; and a gas passage allowing flow of combustion gas/reformate gas; the NOx trap adsorbing nitrogen oxides in the combustion gas, the gas passage extending to the equipment using hydrogen gas from the startup combustor through the reformer, the shift converter and the CO oxidizer;

the control method comprising:

supplying fuel to the startup combustor;

supplying air to the startup combustor;

igniting fuel supplied to the startup combustor;

controlling a flow amount of air supplied to the startup combustor from the air supply device and a flow amount of fuel supplied to the startup combustor from the first fuel supply device, in response to the elapsed time after initiation of combustion in the startup combustor;

stopping supplying fuel to the startup combustor after a first predetermined time has elapsed after initiating combustion; and supplying fuel to the reformer.

21. A fuel reforming system having a reformer for reforming fuel to produce a reformate gas containing hydrogen ($H_2$) gas and carbon monoxide (CO) gas; a shift converter for reacting carbon monoxide contained in the reformate gas with water ($H_2O$) to produce hydrogen; a CO oxidizer which removes CO gas from the reformate gas discharged from the shift converter and supplies the reformate gas to equipment using hydrogen gas; a startup combustor for supplying combustion gas to the reformer, the shift converter and the CO oxidizer so as to warm-up the fuel reforming system; and a gas passage allowing flow of combustion gas/reformate gas, the gas passage extending to the equipment using hydrogen gas from the startup combustor through the reformer, the shift converter and the CO oxidizer; the fuel reforming system comprising:

an NOx trap disposed between the startup combustor and the equipment using hydrogen gas, the NOx trap adsorbing nitrogen oxides in the combustion gas;

first means for supplying fuel to the startup combustor;

second means for supplying fuel to the reformer;

third means for supplying air to the startup combustor;

fourth means for igniting fuel supplied to the startup combustor; and fifth means for commanding the third means to supply air to the startup combustor;

sixth means for commanding the first means to supply fuel to the startup combustor;

seventh means for commanding the fourth means to ignite fuel in the startup combustor so as to initiate combustion in the startup combustor;

eighth means for controlling a flow amount of air supplied to the startup combustor from the air supply device and a flow amount of fuel supplied to the startup combustor from the first fuel supply device, in response to the elapsed time after initiation of combustion in the startup combustor;

ninth means for commanding the first means to stop supplying fuel to the startup combustor after a first predetermined time has elapsed after initiating combustion, and tenth means for commanding the second means to supply fuel to the reformer.

* * * * *